United States Patent Office 3,563,868
Patented Feb. 16, 1971

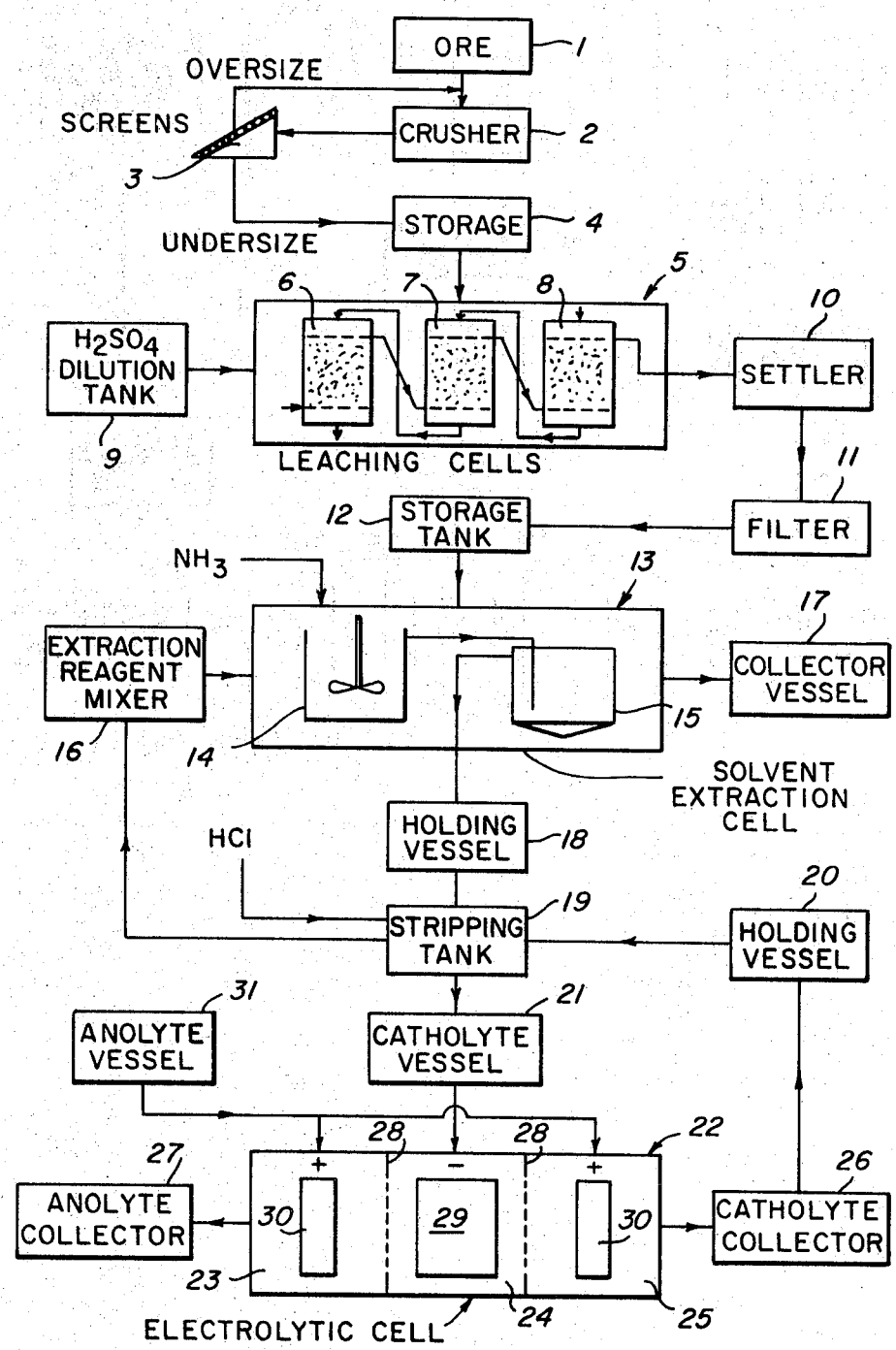

3,563,868
PROCESS FOR EXTRACTING AND RECOVERING MANGANESE FROM ORES
Jan Leja, Vancouver, British Columbia, Canada, and Mahmud A. Qazi, Aminabad, Gujrat, West Pakistan, Pakistan, assignors to Canadian Patents and Development Limited, Ottawa, Ontario, Canada, a corporation of Canada
Filed Feb. 15, 1968, Ser. No. 705,741
Int. Cl. C22d 1/00
U.S. Cl. 204—105                                    10 Claims

ABSTRACT OF THE DISCLOSURE

A process for extracting and recovering manganese from a low grade iron-manganese or in which the ore is dissolved by acid leaching, the leach solution is subjected to solvent extraction with di(2 - ethylhexyl) phosphoric acid dissolved in kerosine, the manganese extraced into the organic phase is stripped into a mixture of formamide and dimethyl formamide by hydrochloric acid and the formamide mixture containing $MnCl_2$ is subjected to electrolysis in a diaphragm cell to plate out metallic manganese.

BACKGROUND OF THE INVENTION

(1) Field of the invention

The invention relates to the extraction and recovery of manganese from low grade iron-manganese ore.

(2) Description of prior art

Many attempts have been made in the past to extract manganese from low grade iron-manganese ores of a complex nature which are not amenable to physical separations or beneficiation.

A typical low grade iron-manganese ore of the above type contains a mixture of oxides and carbonates. The proportion of oxides in the ore usually ranges from about 1 to 25% and, owing to the preponderance of carbonates in the ore, physical methods of concentration are not suitable. Many attempts have been made to apply pyrometallurgical and hydrometallurgical processes but these have met with little success, mainly because of the low iron content and a low iron:manganese ratio in the ore. Attempts have also been made to leach these ores with either chlorine or nitrogen and sulphur containing compounds.

U.S. Pat. 2,810,685 describes a process for obtaining a high purity manganese metal from chloride solutions by electrolysis in a dual electrolyte diaphragm cell using using an aqueous catholyte solution containing manganese chloride and ammonium chloride and an aqueous anolyte solution consisting essentially of a solution of soluble chloride.

Various leaching techniques have also been described in the art for use with manganese ores, such as those described in U.S. Pat. 2,749,965 issued May 26, 1965 and U.S. Pat. 3,028,233, issued Apr. 3, 1962.

SUMMARY OF INVENTION

It has now been found that manganese can be successfully isolated from low grade ores by dissolving the ore, conducting a solvent extraction on the ore in solution with an extraction reagent comprising a dialkyl phosphoric acid containing at least 8 carbon atoms dissolved in an organic solvent or diluent, stripping manganese ions from the manganese-loaded solvent into an organic electrolyte having a high dielectric constant and electrolyzing the organic electrolyte containing manganese ions in a diaphragm cell to plate out metallic manganese.

DESCRIPTION OF THE PREFERRED EMBODIMENT

The ore is suitably dissolved by leaching with an acid such as sulfuric acid, preferably without preliminary roasting.

The solvent extraction reagent which is used is preferably di - (2 - ethylehxyl) phosphoric acid, although other dialkyl substituted phosphoric acids such as di - (1-methylheptyl) phosphoric acid, diisooctylphosphoric acid, di - n - octylphosphoric acid, di - (2 - propyl - 4 - methyl - pentyl) phosphoric acid and di - (2 - ethyl - 4 - methylpentyl) phosphoric acid can be used.

A wide variety or organic diluents, in which the extraction reagent is dissolved, can be employed according to the invention. The minimum requirements of the diluent are that it must be substantially water immiscible, it will dissolve the extraction reagent and it will not interfere with the function of the reagent in extracting manganese values from the aqueous solution. These diluents can be aliphatic or aromatic hydrocarbons, halogenated hydrocarbons, petroleum derivatives, ethers, etc. Examples of these various diluents include toluene, carbon tetrachloride, benzene, chloroform, 2 - ethyl hexanol and particularly kerosine.

Among the suitable organic electrolytes there can be mention, for example, formamide, dimethyl formamide, dimethyl sulfoxide, dimethyl acetamide, pyridine and nitrobenzene. Formamide is particularly suitable because of its high dielectric constant and optimum results are obtained with a mixture of formamide and dimethyl formamide.

The stripping of the manganese-loaded solvent into the organic electrolyte can be conveniently achieved by means of a mineral acid, such as hydrochloric acid.

The electrolytic cell preferably comprises a plurality of anode and cathode compartments separated by suitable diaphragms. Materials resistant to strong acids are required for the diaphragm, e.g. fritted glass, ceramics or Teflon. The diaphragm must be porous enough to allow a small flow of anolyte to the catholyte compartment and yet dense enough to prevent back diffusion of the catholyte. The anodes can be graphite and the cathodes can be stainless steel or titanium. A current density of about 40 to 50 amps per square foot is normally used and the temperature of the cell is advantageously maintained at about 35 to 40° C. for maximum current efficiency.

The catholyte feed is the organic electrolyte containing manganese ions, preferably as manganese chloride. As anolyte feed ammonium chloride is preferably used.

The use of a non-aqueous catholyte, such as a mixture of formamide and dimethylformamide, is a particularly important feature of this invention since this avoids the decomposition of large amounts of ammonium chloride (added to an aqueous catholyte to prevent Mn oxidation) as in an aqueous process such as that described in U.S. Pat. 2,810,685. The higher conductivity and non-reactivity of the organic electrolyte with the deposited Mn results in improved current efficiency, better appearance of the electrolytic manganese and a wider range of control parameters, e.g. pH, temperature concentration, etc.

The attached drawing is a flow sheet illustrating a preferred embodiment of the invention as applied to a practical process for extracting and recovering manganese values from ore.

An ore 1 containing, for example, manganese and iron in about a 1:1 ratio was crushed in crusher 2 and screened on screen 3. The oversized particles were returned to the crusher while the undersized particles were taken to storage 4.

The crushed ore was leached in a countercurrent circuit comprising the leaching cell 5, having three vessels 6, 7 and 8. An approximately 20% solution of $H_2SO_4$ was held in tank 9 and fed to the leaching cell 5. The leach liquor from the first container 6 was contacted with fresh ore to neutralize the free acid and to bring more manganese into solution. In this manner most of the iron was also precipitated. The final leach slurry passed to settler 10, and the leach liquor had a pH of 3 to 3.5 and contained about 60 g./l. manganese and about 1 g./l. iron. The slurry which was obtained was filtered in filter 11 and the filtrate was diluted to about 1.0 molar manganese and collected in tank 12.

In solvent extraction cell 13, consisting of vessels 14 and 15, the leach solution was contacted in agitator 14 with one molar solution of di(2-ethylhexyl)-phosphoric acid in kerosene and a pH of about 5 to 5.5 was maintained during the extraction. The two insoluble liquids, kerosene and water, were then separated in vessel 15. Makeup extraction reagent was held in vessel 16, while the barren aqueous phase was collected in vessel 17.

The manganese was selectively complexed by the alkyl phosphate and the manganese-loaded solvent passed to vessel 18 and then to stripping vessel 19 where it was stripped into a mixture of formamide and dimethyl formamide with 2–4 molar hydrochloric acid or other strong acid. The regenerated solvent, consisting of kerosene containing uncomplexed di(2-ethylhexyl)-phosphoric acid, was returned to vessel 16 of the solvent extraction unit.

The formamide-dimethyl formamide mixture containing $MnCl_2$ was preferably contacted with a second lot of freshly loaded solvent to raise the Mn content to about 2 molar concentration. This solution then became the catholyte 21 in the subsequent electrolytic process.

In the example shown electrolytic cell 22 is divided into three cells 23, 24 and 25 by means of two fritted glass diaphragms 28. The center cathode 29 is stainless steel while the two outer anodes 30 are graphite.

The anode compartments 23 and 25 were charged from vessel 31 with an aqueous solution of $NH_4Cl$ (0.85 lb./gal.) at pH 2.5 to 2.8. The cathode compartment was charged from vessel 21 with a 1:4 formamide:dimethyl formamide mixture diluted with 38% HCl in a ratio of 2:1, containing about 0.5 lb./gal. $MnCl_2$ and about 0.01 lb./gal. $NH_4Cl$ at a pH of about 7.5 to 8.0.

The vessel was operated at a current density of about 45 to 50 amps per square foot and achieved a current efficiency of about 76%. The operational temperature was about 35° C.

Manganese was collected as a deposite on the cathode and the weak catholyte was collected in vessel 26 and recycled to vessel 20 for reuse in the stripping units 19. The anolyte was collected in vessel 27.

The process of the invention will be further illustrated by reference to the following non-limitative examples.

Example 1.—A low grade iron-manganese ore was obtained from New Brunswick, Canada, and a chemical analysis of the ore is shown in Table I below.

TABLE I

| Assay: | Percent by weight |
|---|---|
| Mn | 12.4 |
| Fe | 14.2 |
| $SiO_2$ | 32.25 |
| $Al_2O_3$ | 9.28 |
| CaO | 3.12 |
| MgO | 10.65 |
| $TiO_2$ | 0.18 |
| $Na_2O$ | 1.00 |
| $K_2O$ | 1.37 |
| $P_2O_5$ | 1.24 |
| S | 0.10 |
| Loss on ignition | 11.7 |

The ore was crushed to pass a 65 mesh screen and a 100 gram sample of the crushed ore was leached in a solution of 37.5 grams of 95% sulfuric acid dissolved in 180 ml. water. The leaching was continued with stirring for 30 minutes at 50–60° C. and the final leach liquor had a pH of 3–3.5 and contained 59.8 g./l. of manganese with an extraction of 92.4%.

The leach slurry was filtered, the filtrate was diluted to about 1.0 molar Mn and contacted with an extraction reagent consisting of 80 grams of di-(2-ethylhexyl)-phosphoric acid prepared as a 1 molar solution in kerosene. A pH of 5–5.5 was maintained during the extraction. About 99% of the manganese was extracted into the organic phase and the manganese in the solvent was then stripped into 100 ml. of a 1:4 mixture of formamide and dimethyl formamide with 2–4 molar hydrochloric acid giving $MnCl_2$. The formamide mixture containing $MnCl_2$ was then contacted with a second lot of freshly loaded solvent to raise the Mn content to 2 molar concentration and the pH was adjusted to 7.5. This was then used as catholyte in subsequent electrolytic recovery of manganese.

As anolyte an aqueous solution of 85 g./l. $NH_4Cl$ at a pH of 2.5 was prepared.

These anolyte and catholyte solutions were then fed to an electrolytic cell with two fritted glass diaphragms as described hereinbefore. The cell was operated at a current density of 50 amps per square foot and achieved a current density of about 76%. The cell temperature was 35° C. and manganese was collected as a deposit on the cathode.

Example 2.—A second test was conducted using the same ore as in Example 1.

A —65 mesh sample of the ore was leached with 16% $H_2SO_4$ for 30–40 minutes at 60–70° C. with constant stirring. Over 90% Mn was dissolved from the ore and the acid consumption was about 1.5 mole per mole of Mn leached out.

This was followed by a single stage batch extraction of Mn from the leach liquor into a kerosene solution containing 0.5 M di-(2-ethylhexyl)-phosphoric acid at a pH of about 5. The manganese complexed by the di-(2-ethylhexyl)-phosphoric acid was stripped with concentrated HCl into formamide by countercurrent flow until the formamide solution was almost neutralized.

The formamide containing 12–16% Mn as $MnCl_2$ was used as catholyte in the electrolytic deposition of Mn from the formamide. Prior to electrolytic deposition the pH of the catholyte was adjusted to about 7.5 with $NH_3$.

As anolyte there was used an aqueous solution of 90–100 g./l. $NH_4Cl$ at a pH of about 2.5.

The electrolysis was conducted at 35° C. in a cell with two fritted glass diaphragms as described hereinbefore at a current density of 50 ma./cm.$^2$ and 6.5 volts. The current efficiency was about 76%, and manganese was collected as a deposit on the cathode.

What we claim as our invention is:

1. A process of extracting and recovering manganese values from ore containing iron and manganese, which comprises acid leaching the ore to dissolve manganese, conducting a solvent extraction on the ore in solution with dialkyl phosphoric acid containing at least 8 carbon atoms dissolved in an organic solvent which is substantially water immiscible, will dissolve the extraction reagent and will not interfere with the function of the reagent in extracting manganese values from the solution, stripping manganese ions from the manganese-loaded solvent into an organic electrolyte having a high dielectric constant and electrolyzing the organic electrolyte containing the manganese ions in a diaphragm cell to plate out metallic managanese.

2. A process according to claim 1 wherein the ore is dissolved by acid leaching.

3. A process according to claim 1 wherein the solvent extraction is conducted with di-(2-ethylhexyl)-phosphoric acid.

4. A process according to claim 3 wherein the manganese-loaded solvent is stripped by means of a mineral acid.

5. A process according to claim 4 wherein the mineral acid is hydrochloric acid.

6. A process according to claim 1 wherein the organic electrolyte is at least one amine selected from the group consisting of formamide and dimethyl formamide.

7. A process according to claim 6 wherein the electrolysis is conducted in a dual electrolyte cell having an anode and a cathode in separate compartments separated by a diaphragm.

8. A process according to claim 7 wherein the organic electrolyte containing the manganese ions is fed to the cell as catholyte, ammonium chloride solution is fed as anolyte and manganese metal is deposited at the cathode.

9. An electrolytic process for producing manganese metal which comprises feeding an organic electrolyte of high dielectric constant having manganese ions dissolved therein as catholyte to a compartment of a dual electrolyte cell having an anode and a cathode in separate compartments separated by a diaphragm, feeding an anolyte comprising an ammonium chloride solution, and establishing electrical conduction through the cell to deposit manganese metal at the cathode.

10. A process according to claim 9 wherein the catholyte comprises a mixture of formamide and dimethyl formamide having $MnCl_2$ dissolved therein.

References Cited
UNITED STATES PATENTS

| | | | |
|---|---|---|---|
| 2,396,570 | 3/1946 | Guareschi | 204—105 |
| 2,992,894 | 7/1961 | Hazen et al. | 23—312X |
| 3,105,737 | 10/1963 | Saito | 23—312X |
| 3,397,130 | 8/1968 | Brantley et al. | 204—105 |
| 3,449,074 | 6/1969 | Schertzer | 23—312X |

DANIEL E. WYMAN, Primary Examiner

C. F. DEES, Assistant Examiner